United States Patent [19]

O'Leary

[11] 4,179,734

[45] Dec. 18, 1979

[54] FLOATING POINT DATA PROCESSOR HAVING FAST ACCESS MEMORY MEANS

[75] Inventor: George P. O'Leary, Beaverton, Oreg.

[73] Assignee: Floating Point Systems, Inc., Portland, Oreg.

[21] Appl. No.: 846,889

[22] Filed: Oct. 31, 1977

Related U.S. Application Data

[62] Division of Ser. No. 702,148, Jul. 2, 1976, Pat. No. 4,075,704.

[51] Int. Cl.² ............................................. G06F 13/06
[52] U.S. Cl. ................................................... 364/200
[58] Field of Search ... 364/200 MS File, 900 MS File

[56] References Cited

U.S. PATENT DOCUMENTS

| 3,411,142 | 11/1968 | Lee et al. | 364/900 |
| 3,651,476 | 3/1972 | Metz et al. | 364/200 |
| 3,928,857 | 12/1975 | Carter et al. | 364/200 |
| 4,087,853 | 5/1978 | Kashio | 364/200 |

*Primary Examiner*—David H. Malzahn
*Attorney, Agent, or Firm*—Klarquist, Sparkman, Campbell, Leigh, Hall & Whinston

[57] ABSTRACT

A digital data processor includes a plurality of memory registers, a floating point adder and a floating point multiplier intercoupled by a plurality of simultaneously operable parallel buses facilitating multiple parallel operations during one clock cycle or instruction. The floating adder and multiplier each include a number of stages separated by intermediate temporary storage registers which receive the partial results of a computation for use by the next stage during the next clock period. Floating point additions, multiplications and other arithmetic and logical results are produced during each clock cycle. Memory registers comprise a data pad having a plurality of selectable stack registers and means for writing information into said data pad during one clock cycle for retrieval during the next clock cycle.

9 Claims, 10 Drawing Figures

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| B | SOP | | SH | | | SPS | | | | SPD | | | | FADD | | | A1 | | | A2 | | | COND | | | | | DISP | | | |
| S-Pad Group | | | | | | | | | | | | | | Adder Group | | | | | | | | | Branch Group | | | | | | | | |
| | | | | | | SOPI | | | | | | | | | | FADDI | | | | | | | | | | | | | | | |
| | | | | | | SPEC OPER | | | | | | | | | | I/O | | | | | | | | | | | | | | | |

| 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|
| DPX | | DPY | | DPBS | | | | XR | | | YR | | | XW | | | YW | | FM | | MI | | M2 | | MI | | MA | | DPA | | TMA |
| Data Pad Group | | | | | | | | | | | | | | | | | | | Multiply Group | | | | | Memory Group | | | | | | | |
| | | | | | | | | | | | | | | | | | | | VALUE | | | | | | | | | | | | |

FIG. 10

FLOATING POINT DATA PROCESSOR HAVING FAST ACCESS MEMORY MEANS

This is a division of application Ser. No. 702,148, filed July 2, 1976 now U.S. Pat. No. 4,075,704.

BACKGROUND OF THE INVENTION

The present invention relates to a data processor and particularly to a floating point processor useful in high speed array processing.

In performing lengthy computations such as fast Fourier transforms, convolutions and the like, excessive time and expense in computer operation may be involved because of the large number of repetitive calculations which must be sequentially performed. Computer apparatus is known for performing a number of computations substantially in parallel, for example as set forth in U.S. Pat. No. 3,771,141 granted to Glen J. Culler on Nov. 6, 1973. However, circuitry of this type has proved somewhat difficult to manufacture because of the multiplicity of input connections associated with processor registers, rendering difficult the execution thereof on a plurality of conventional circuit boards. Moreover, a processor of this type requires an overriding operation code to define a set of instructions wherein many instructions cannot be utilized simultaneously. Furthermore, high speed computation may be impeded in prior art processors because of the inability to access conveniently information that has just been stored.

SUMMARY OF THE INVENTION

Briefly, in accordance with an embodiment of the present invention, a floating point data processor comprises a floating point adder or arithmetic unit, a floating point multiplier, and memory register means. In the preferred embodiment, a plurality of parallel, simultaneously operable buses interconnect the basic elements of the processor for enabling a number of simultaneous operations without conflict and without requiring a multiplicity of interconnections between circuit boards.

According to the present invention, memory register means comprises a data pad having a plurality of selectable accumulator registers with means for writing information into said data pad during one clock cycle for retrieval during the next clock cycle.

It is accordingly an object of the present invention to provide an improved parallel data processor capable of rapid computation.

It is another object of the present invention to provide an improved floating point data processor characterized by low "overhead" time for addressing and non-computational functions, and characterized by ability efficiently to access non-sequential locations in memory.

It is another object of the present invention to provide an improved floating point data processor including a plurality of readily accessible accumulator means.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Figure 1:
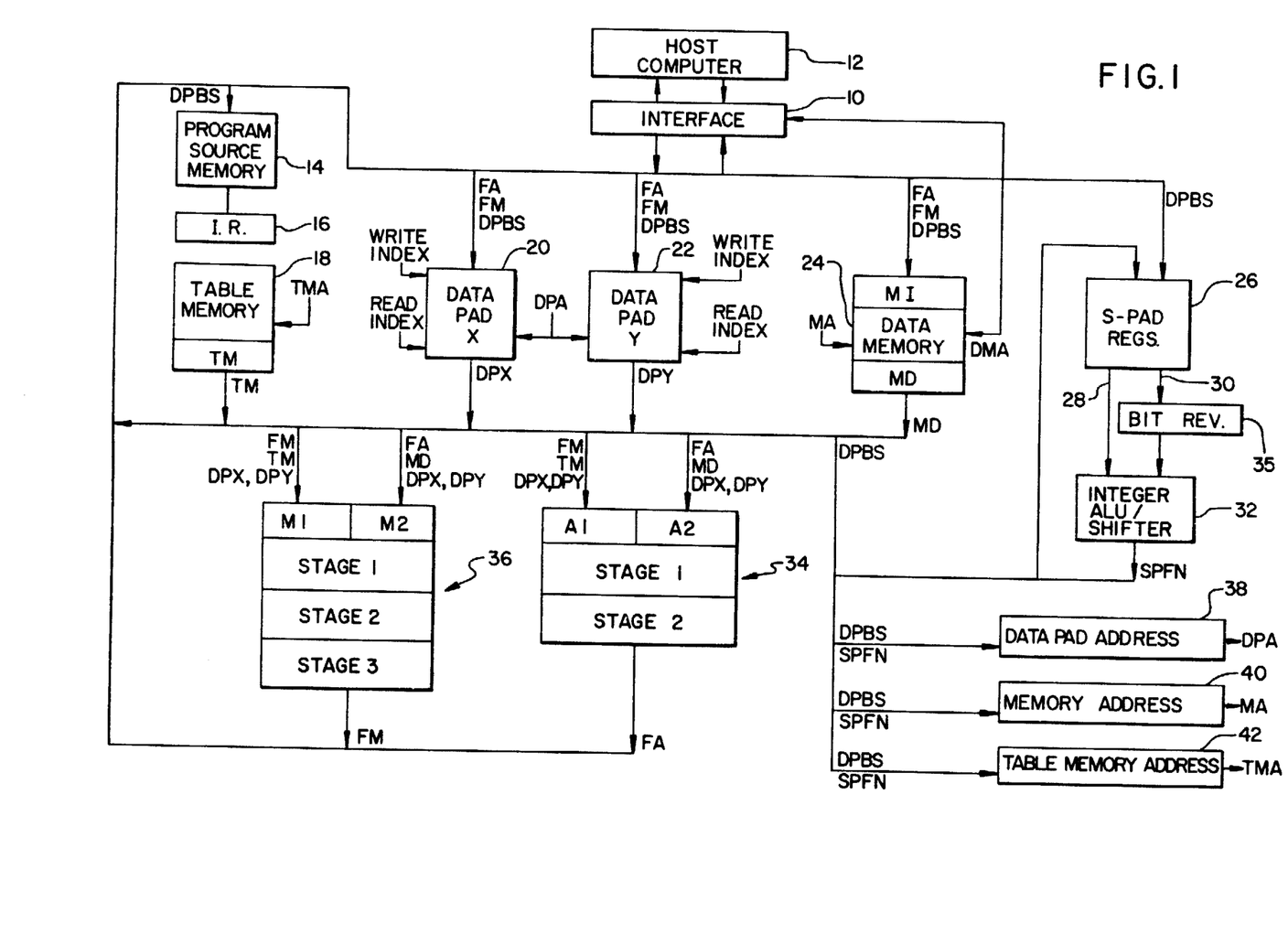
FIG. 1 is a block diagram of a data processor in accordance with the present invention.

Referring to the drawings and particularly tp FIG. 1, the block diagram illustrates the general organization of the processor according to the present invention wherein the various blocks are joined in a manner illustrating the general bus structure between the various elements. As hereinafter more fully described, the bus structure does not comprise a single bus but rather seven separate buses providing multiple pathways between the various arithmetic and memory elements whereby a high degree of parallelism in operation is facilitated. Thus, the basic elements of the block diagram can be operated simultaneously without conflict.

The processor includes an interface unit 10 for exchanging information between a host computer 12 and the bus structure of the present processor. The processor further includes a program source memory 14 for storing a plurality of instructions and providing the instructions sequentially to an instruction register 16 which brings about a multiplicity of interconnections appropriate for carrying out the instruction. The processor further includes a table memory 18 suitably comprising a read-only memory for storing, for example, table lookup information. In a given example, the table memory may store sines and cosines applicable to a continuing calculation. The table memory 18 is addressed by the table memory address, TMA, to provide the desired information to its output register, TM. Although the table memory is generally a read-only memory, according to certain modifications of the present processor a random access memory may be substituted therefor and can be programmed to receive table lookup information.

The processor further includes a data pad memory, according to the present invention, divided into two portions, data pad X, 20, and data pad Y, 22, addressed by a common address pointer, DPA which designates a plurality of concurrently functioning registers within data pad X and data pad Y. Within this group of registers, further addressing is accomplished by means of the read index and write index applied to each data pad. The data pad registers operate in the manner of accumulators and are characterized by their fast access and retrieval times.

The main memory of the processor comprises data memory 24, which in a particular instance comprised 64K of memory locations, the data memory also including a memory input register, MI, and a memory output register, MD. The data memory is addressed by means of a memory address, MA, and direct memory access, DMA, is provided between the data memory and interface 10.

The processor includes an S-pad 26, the function of which is to provide address arithmetic in parallel with the main arithmetic of the processor. First and second outputs 28 and 30 respectively couple to an arithmetic logic unit or ALU 32 and a bit reverse circuit 34. The bit reverse circuit 35 is further coupled to ALU 32 and is useful in procedures such as the fast Fourier transform.

The bus system further provides input to, and receives the output from, an adder 34 having two inputs A1 and A2, and supplying an output FA. This adder is a floating point adder including both exponent and mantissa portions, and is also a two stage pipelined circuit wherein a complete floating point addition is accomplished in two clock cycles, but wherein a complete parallel addition output is produced each clock cycle.

Further included in the processor is a three stage floating point multiplier 36 including inputs M1 and M2, such multiplier producing an output FM. Again, the multiplier includes both exponent and mantissa computational portions. A complete multiplication takes place in three clock cycles, but with the pipelined configuration employed, a complete parallel multiplication output is produced during each clock cycle. Address registers are provided for each of the data pads, the data memory, and the table memory respectively as indicated at 38, 40 and 42. These address registers store the addresses designated as DPA, MA and TMA.

In the FIG. 1 block diagram, the outputs for each of the blocks are indicated by appropriate letter designations. The same letter designations are applied next to input lines to the various blocks, indicating the input which may be received thereto. Thus, input M1 of the multiplier may receive an input FM from the output of the multiplier, an imput TM from the table memory, or the inputs DPX or DPY from the respective data pads. Each of the blocks may receive one of the inputs indicated during the same clock cycle, for thereby carrying on a plurality of simultaneous computational or storage tasks. The basic clock cycle for the machine is 167 nanoseconds, i.e., approximately six clock cycles take place per microsecond.

Figure 2:
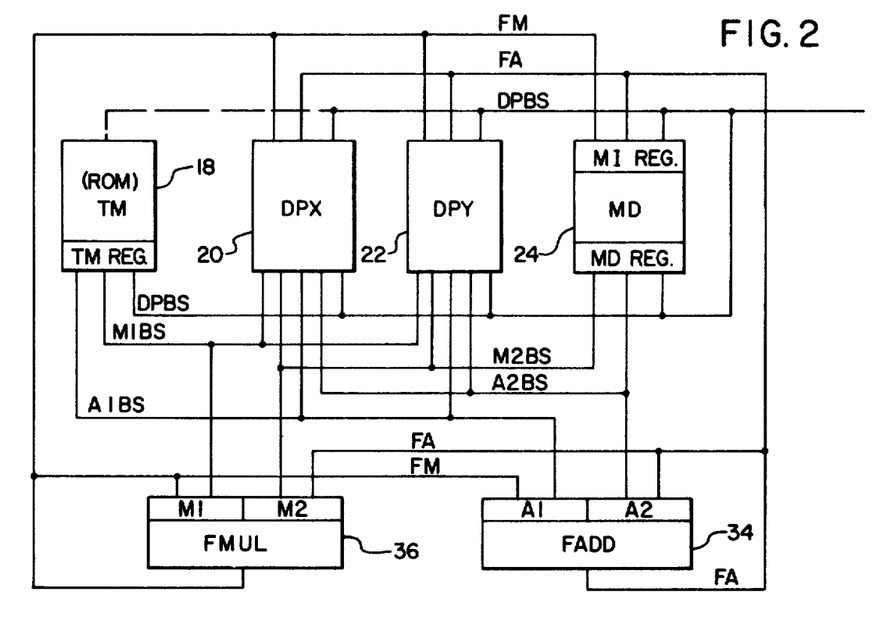
FIG. 2 is a more detailed version of a portion of the FIG. 1 block diagram illustrating bus connections in greater detail.

Referring to FIG. 2, a more complete representation of the bus configuration is illustrated. The respective buses are designated FA, FM, A1BS, A2BS, M1BS, M2BS and DPBS. Each bus is a parallel bus. The designations either indicate the source of the bus, as in the case of FA and FM, or the destination of the bus in the case of the remainder, except for DPBS. DPBS is the only conventional bus, in that multiple inputs and multiple outputs are provided whereby the same is operated in a serial or sequential manner, for interconnecting the elements 18, 20, 22 and 24. Otherwise, the buses are single source or single destination buses, and may be used simultaneously with each other (and with DPBS), facilitating multiple operations at the same time.

The bus structure is symmetrical, and primarily couples the multiple inputs and multiple outputs of the floating adder 34 and the floating multiplier 36. Each of the outputs FA and FM are connected in an iterative or recursive manner to the inputs of both the adder and multiplier, permitting certain operations as for example calculation of dot products with accumulation of a sum without the interposition of an accumulator register. The FA and FM buses are brought in directly to the adder and multiplier inputs, as well as to the data pad and data memory inputs. Inputs to the floating adder and floating multiplier are collected on the buses designated A1BS, A2BS, M1BS and M2BS. Timing is less crucial for the latter inputs. The bus designated A1BS collects inputs from the table memory and data pads while A2BS collects inputs from the data memory and data pads. Similarly bus designated M1BS collects inputs from table memory and data pads, while M2BS collects inputs from data pads and data memory. This symmetrical arrangement of multiple buses is found quite efficacious in bringing about the high speed parallel processing. In addition to the connections shown in FIG. 2, the bus DPBS is connected to an I/O bus of the host computer via means not shown.

Pursuant to one instruction, the desired input can be applied to the adder and multiplier, simultaneously and independently. Thus, input A1 can receive any one of four inputs, while input A2 can receive any one of four inputs at the same time. Likewise, at this same time, input M1 can receive any one of four inputs, while input M2 can receive any one of four inputs, without conflict. The multiple bus structure also allows the distribution of the circuitry over a plurality of etched circuit cards without the difficulty encountered in prior multiple register input circuits. It is noted that in the case of a single output, multiple input bus, selection multiplexers are employed at the bus inputs rather than being located at the destination register, whereby a multiplicity of connections to the destination register are avoided. Therefore, the input sources are more easily distributed over several etched circuit cards.

Figure 3:
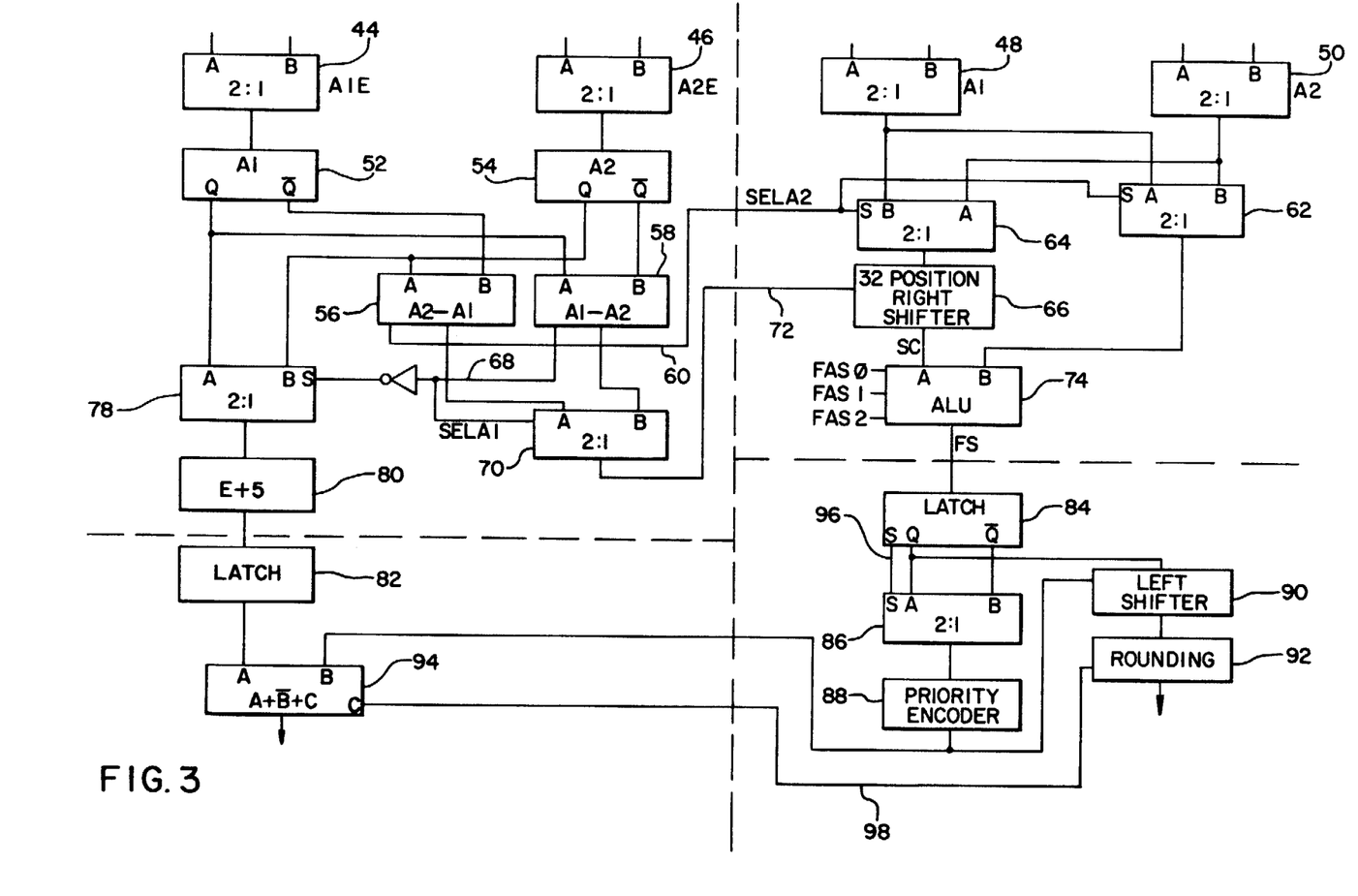
FIG. 3 is a block diagram of a floating point adder circuit in the aforementioned processor.

FIG. 3 more fully illustrates the floating point adder 34 from FIGS. 1 and 2. It should be borne in mind that the processor system operates with low true signals, while negative numbers are in two's-complement form. A floating point number comprises 28 mantissa bits and 10 bits of exponent, totaling 38 bits. Referring to FIG. 3, the A1 exponent multiplexer 44 receives the FM bus and the A1BS bus exponents at inputs A and B respectively, while the A2 exponent multiplexer 46 receives the FA and A2BS exponent bus inputs respectively on its inputs A and B. Similarly, the A1 mantissa register 48 and the A2 mantissa register 50 receive corresponding mantissa inputs from the respective buses, as would be indicated according to FIG. 2.

For bringing about floating point addition or the like, the exponents are compared to see which is larger, and then a positive difference between the exponents is generated. The exponents are subtracted in both directions for enhancing timing considerations. The mantissa that corresponds to the larger exponent is coupled to an ALU or arithmetic logic unit, and the mantissa corresponding to the smaller exponent is first shifted into corresponding position before the arithmetic operations are undertaken.

Referring again to FIG. 3, the exponents from multiplexers 44 and 46 are first applied to registers 52 and 54 respectively wherein non-complemented and complemented outputs are generated for coupling to ALU's 56 and 58, wherein ALU 56 effectively subtracts A1 from A2, while ALU 58 effectively subtracts A2 from A1. If the A2 exponent is larger than the A1 exponent, a signal on lead 60 operates multiplexer 62 to select the output of mantissa register 50 rather than the output of mantissa register 48. If the A2 exponent is not larger than the A1 exponent, then multiplexer 62 selects the output of register 48. Meanwhile, multiplexer 64 is operated to select the mantissa corresponding to the smaller exponent for delivery to right shifter 66.

An output on lead 68 of ALU 58 is determined according to whether the A1 or A2 exponent is larger, and multiplexer 70 is operated thereby for selecting the positive difference between the two exponents. Therefore, multiplexer 70 provides the proper difference, as received on either its input A or input B, to shifter 66 via connection 72. Shifter 66 then shifts its input to the right by the number of places corresponding to the difference between the exponents. The output of shifter 66 is provided as the second input to ALU 74.

Lead 68 is also coupled via inverter 76 to multiplexer 78 for selecting the larger exponent. This exponent is then coupled to adder 80 wherein a positive five is added for assisting the subsequent "normalization" logic wherein normalization can then be accomplished by a shift in a given direction. The exponent +5 is then stored in latch 82.

Meanwhile, ALU 74 performs the desired logical or arithmetic operation on the mantissa delivered from multiplexer 62 and the shifted mantissa delivered from shifter 66. The inputs designated FAS0, FAS1 and FAS2 code the various operations of the ALU 74, for adding B to A, subtracting B from A, subtracting A from B, or performing AND, OR or equivalence logical functions. The output of the ALU is stored in latch 84.

It will now be seen the exponent and mantissa as processed this far are stored in latches 82 and 84, with the result appearing as an un-normalized floating point sum. The floating add computations performed thus far occur during one clock cycle, and the partial results are stored and employed in the next clock cycle. After the results are stored in latches 82 and 84, the circuitry thereabove can then be utilized for beginning the next subsequent floating point addition operation during the next clock cycle. It will be seen the portion of the floating adder above the dashed lines, just above latches 82 and 84, corresponds to stage 1 of the floating point adder, while the portion of the circuitry below the dashed lines corresponds to stage 2.

Complemented and non-complemented outputs of latch 84 are coupled to multiplexer 86, controlled by a sign bit from latch 84 in a manner hereinafter described. The output of multiplexer 86 is applied to priority encoder 88 which detects the first "low" signal received, for producing an output corresponding to the number of "high" signals occurring before the occurrence of the "low" signal. This number indicates how far the un-normalized mantissa output will have to be shifted to shift the first "low" until MSB minus one is a low, MSB referring to the most significant bit. The output of priority encoder 88 is applied to left shifter 90 which also receives the non-complemented output of latch 84 for left-shifting such output the requisite number of places for normalization. It is also understood the shifting takes into consideration the "bias" of five places applied by adder 80. The output of left shift 90 is coupled to rounding ALU 92.

The output from priority encoder 88 is also applied to an ALU 94. ALU 94 receives the output of latch 82 and subtracts the output of priority encoder 88 therefrom, i.e., the number of left shifts undergone by the mantissa. The exponent will be thereby corrected. The left shifting and exponent correction operation is termed normalizing.

The sign bit from latch 84 is applied to multiplexer 86 for accommodating the operation of priority encoder 88 in case the number in latch 84 is in two's-complement form. Since the priority encoder is only capable of looking for a "low" signal, if a sign bit is indicated on line 96, multiplexer 86 then selects the complemented or Q output of latch 84 for presentation to priority encoder 88.

The output of left shifter 90 is applied to rounding ALU 92 as hereinbefore mentioned. If the residue from the calculation, i.e., those bits beyond the number of mantissa bits normally handled by the machine is greater than 0.5 of the LSB, ALU 92 "rounds" or increases the least significant bit in the mantissa, which is retained, by one. If the residue is less than or equal to 0.5, "rounding" does not take place. This method of rounding has a tendency to cause errors to converge towards zero. If the rounding produces a carry into the most significant bit position, the result is shifted right one position, and a carry is applied via line 98 for adding one to the exponent in ALU 94.

The normalization and rounding take place in stage 2 of the adder, while further inputs are applied to stage one of the adder. It will be seen that an adder output can be produced every clock cycle as a consequence of the "pipelined" configuration, thereby enhancing the speed of operation of the parallel processor in producing a floating point arithmetic computation.

Figure 4:
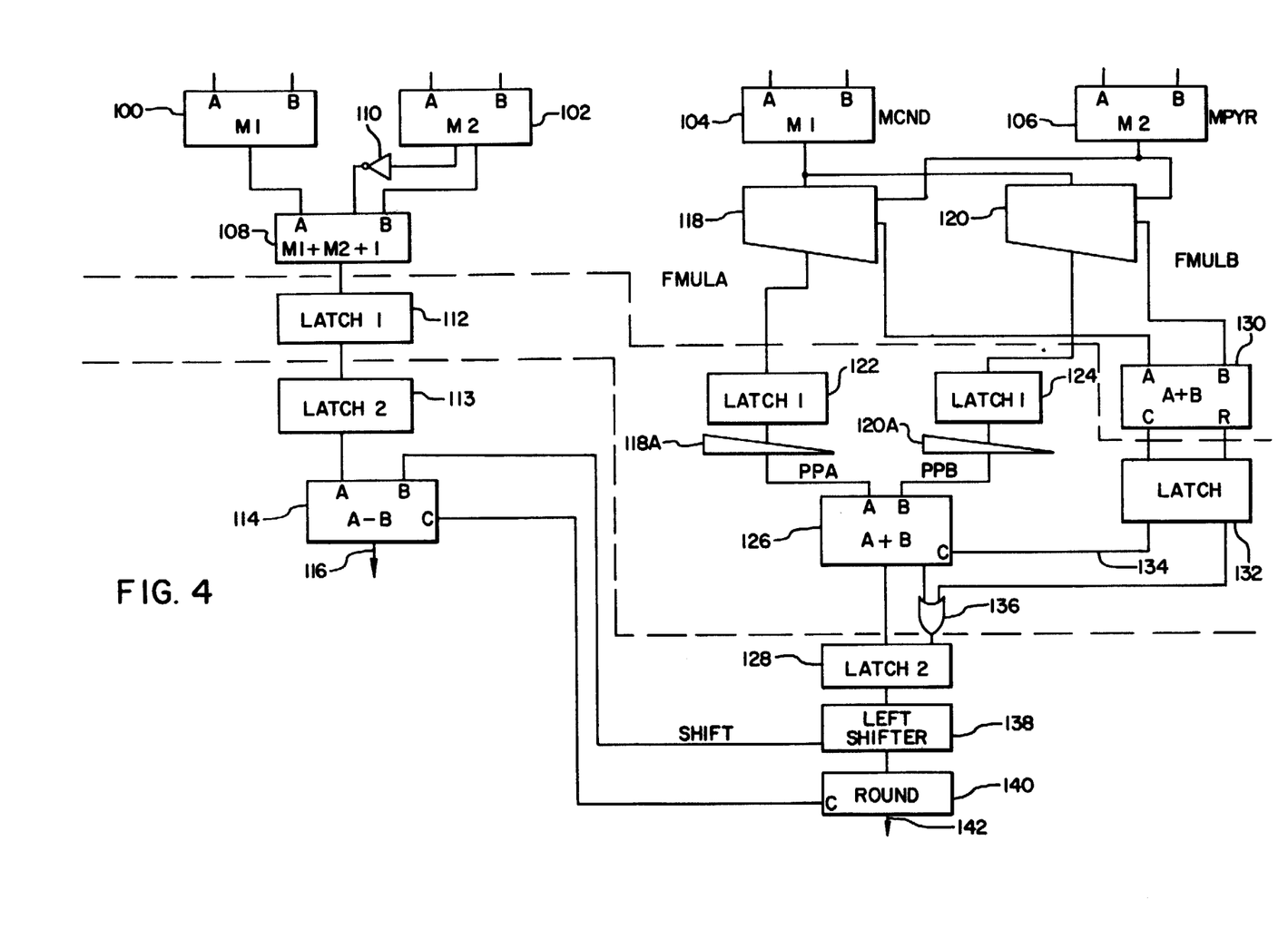
FIG. 4 is a block diagram of a floating point multiplier circuit in the subject processor.

FIG. 4 illustrates the floating point multiplier 36 from FIGS. 1 and 2. The M1 exponent register 100 receives the FM bus and the M1BS bus exponents at inputs A and B respectively, while the M2 exponent register 102 receives the FA and M2BS exponent bus inputs respectively on its inputs A and B. Similarly M1 mantissa register 104 and M2 mantissa register 106 receive corresponding mantissa inputs from the respective buses, as would be indicated according to FIG. 2. Register 104 is conveniently designated as receiving the mantissa multiplicand, while register 106 is designated as receiving the mantissa multiplier.

The output of register 100 is supplied as a first input to adder 108 which receives a second input from register 102. Adder 108 adds the two exponents for purposes of multiplication, and also adds one to provide a bias such that shifting at a later time for normalization purposes may be accomplished in one direction. Moreover, the most significant bit from register 102 is inverted by inverter 110 for application to adder 108 for, in effect, subtracting the value 512 from the M2 input. The exponents are represented in offset binary form. The exponent is a 10 bit, two's complement number, with the most significant bit, or sign bit, inverted for in effect adding 512 to the numbers. The purpose of inverter 110 is to remove a bias of 512 from one of the exponents, so the two exponents may be added, and a sum produced, which has only a bias of 512 added thereto. These elements complete pipeline stage 1.

The output from adder 108 is coupled to latch 112, the latter comprising the exponent part of stage 2 of the multiplier pipeline. Thus, while an exponent addition is stored in latch 112 for a given multiplication, further exponent inputs may be applied at registers 100 and 102 during the ensuing clock cycle. During a yet further clock cycle, the exponent information from latch 112 is stored in a latch 113, forming a portion of stage 3 of the multiplier, and providing an output to adder 114 which performs a normalization function as hereinafter described. The exponent output of the multiplier is indicated at 116.

Figure 5:
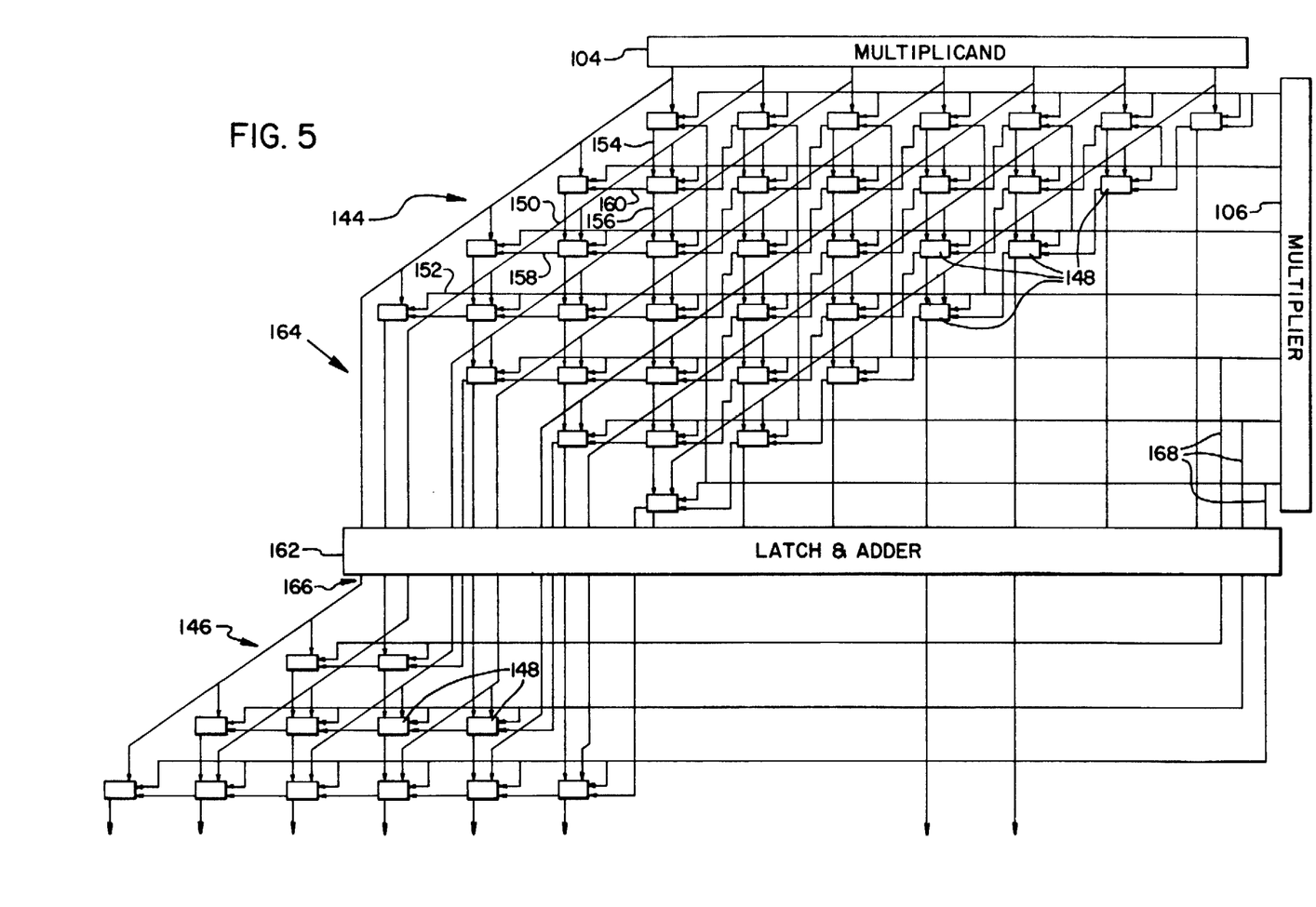
FIG. 5 is a more detailed block diagram of a portion of the FIG. 4 multiplier.

An output from multiplicand register 104 is applied as an input to multiplication arrays 118 and 120 in the mantissa portion of the multiplier, while an output from multiplier register 106 is applied as a second input to multiplication arrays 118 and 120. These multiplication arrays, which will be described in greater detail in connection with FIG. 5, are each divided into first and second portions such that part of a multiplication is performed during the next clock cycle. Thus, the multiplication operation of multiplication array 118 is completed in an array section 118A, while multiplication operation of multiplication array 120 is completed employing array section 120A whereby to implement a pipelined mantissa calculation. Intermediate results are stored in respective latches 122 and 124 forming part of stage 2 of the pipelined multiplier in order that further inputs can be received via registers 104 and 106 into multiplier stage 1 during the ensuing clock cycle.

The mantissa portion of the multiplier is also divided between left and right sections designated FMULA and FMULB wherein it is understood FMULA includes elements 118, 122 and 118A, while FMULB includes elements 120, 124 and 120A. Each of the portions FMULA and FMULB multiplies 14 bits of the multiplier times 28 bits of the multiplicand. The entire multiplicand mantissa is supplied from register 104 to each of the multiplication arrays 118 and 120, but multiplication array 118 receives 14 bits of the multiplier which are different from the multiplier bits supplied to multiplication array 120. The multiplication arrays receive alternate pairs of input bits, and thus array 120 suitably receives multiplier bits 0,1,4,5,8,9, etc., while array 118 suitably receives multiplier bits 2,3,6,7,10,11, etc., wherein these numbers indicate respective multiplier bit positions.

The partial products designated PPA and PPB received respectively from array sections 118A and 120A are added in an adder 126 to provide the mantissa portion of the product which is coupled to a latch 128. Adder 126 completes the mantissa portion of stage 2 of the pipelined multiplier, while latch 128 comprises an element of stage 3.

It will be appreciated the mantissa multiplication produces a larger number of product bits than were present in either the multiplier or the multiplicand. The lower order bits are eventually discarded but are considered in respect to carries which may affect the higher order bits and in respect to preliminary rounding considerations. The multiplication within arrays 118 and 120 is complete so far as the lower order bits are concerned, i.e., the bits of lower order than the 28 bit mantissa product which will be retained. Lower order partial products are provided as inputs A and B to an ALU 130 wherein the inputs are added, and in the event the sum of the partial products from arrays 118 and 120 produces a carry, such carry, C, is coupled to latch 132 in stage 2 of the multiplier mantissa portion. The carry information is then supplied by means of connection 134 to adder 126 where the carry is added to the sum of the higher order digit partial products performed in adder 126. Moreover, a preliminary rounding detection is made in ALU 130 to determine whether the bits to be discarded would be greater than 0.5 of the LSB. In this case, a rounding indication is also stored in latch 132 and supplied via OR gate 136 together with the low order bit information from adder 126 coupled to latch 128.

Left shifter 138 left shifts the output of latch 128 to shift the first "low" until MSB-1 is low. The number of shifts is applied to adder 114 for the purpose of correcting the exponent. The output of left shifter 138 is applied to rounding ALU 140 and if the residue from the calculation after shifting is greater than 0.5, ALU 140 "rounds" or increases the least significant bit in the mantissa, which is retained, by one. If the residue is less than or equal to 0.5, "rounding" does not take place. In the event of rounding, a carry signal, C, may be delivered to adder 114 for further correcting the exponent output.

As hereinbefore indicated, the exponent result of the multiplication, at 116, and the mantissa result of the multiplication, at 142, are produced every clock cycle, even though three clock cycles are employed to complete a given multiplication. This pipelined configuration thus further enhances the speed of operation of the parallel processor in producing a floating point arithmetic computation. The positioning of intermediate latches in the various stages of the pipeline to "catch" the preceding intermediate results also facilitates timing and servicing of the processor equipment.

A multiplier array is illustrated in greater detail in FIG. 5, and it is understood this array may comprise either the array combination 118-118A from FIG. 4 or the combination 120-120A from FIG. 4. The upper portion of the array, 114, corresponds to either array section 118 or 120 in stage 1 of the multiplier, while the lower portion, 146, corresponds to either array section 118A or 120A in stage 2 of the multiplier. Multiplicand input device 104 corresponds to register 104 in FIG. 4, and multiplier input device 106 corresponds to register 106 in FIG. 4. The multiplication array is formed from a plurality of semiconductor chips 148 each of which multiplies four bits of the multiplicand by two bits of the multiplier according to Booth's algorithm in two's-complement digital multiplication. The most significant bit from input device 104 may be considered as being supplied from the left hand output lead, while the most significant bit from input device 106 may be considered as being supplied from its lower or right hand output lead. A suitable semiconductor chip comprises the type Am25S05 manufactured by Advanced Micro Devices, Inc., Sunnyvale, Calif.

Each of the chips receives four bits of multiplicand input at 150, and two bits of multiplier input at 152. Also coupled to each chip is a column input 154, for all chips except those in the top row, and a carry input 158 from the next lower order chip in the same or preceding row, unless such chip is in the top row in which case the carry comes from the multiplier input device, as known to those skilled in the art. Each chip also provides a sum output 156 as the column input to the chip therebelow and a carry output 160 to the next higher order chip, if any, in the same or succeeding row. As can be seen, each row of seven chips is shifted to the left by one column position from the chips in the preceding row, with each succeeding row receiving a higher order pair of multiplier bits as inputs.

The multiplication is interrupted at 164 where section 144 of the multiplication array is concluded and the partial results are delivered to latch and adder circuitry 162 for temporary storage. Latch and adder 162 corresponds to the latch 122 or 124 in FIG. 4 which receives the output of the array section under discussion, as well as ALU 130 and latch 132 wherein it is understood ALU 130 receives additional inputs from the remaining array section. The diagonal break in the array at 164 is determined according to the required propagation time through the multiplier chips in multiplication array section 144 such that the requisite signals can pass through all the chips and interconnections in section 144, and provide outputs which are stable at circuit 162, during a given clock cycle of 167 manoseconds. Starting from the first chip at the upper right hand corner of the array, it is seen a maximum of 7 chips is involved in any combination of carry and sum paths between the upper right hand chip and any of the remote chips along the break at 164.

As circuit 162 inputs are provided the column sums and partial sums as developed by array section 144 as well as the complete multiplicand and the higher order six bits of the multiplier indicated at 168. These intermediate values are latched and provided on leads 166 to lower section 146 of multiplication array where the multiplication is completed during the next clock cycle, as other values of multiplicand and multiplier are then coupled into array section 144. Thus, a multiplication output is provided each clock cycle although more clock cycles are required to finish a given multiplication. The present system is particularly efficacious in carrying out two's-complement digital floating point multiplication in a reasonable period of time without requiring an unduly complex circuit or undue expenditure for equipment.

Figure 6:
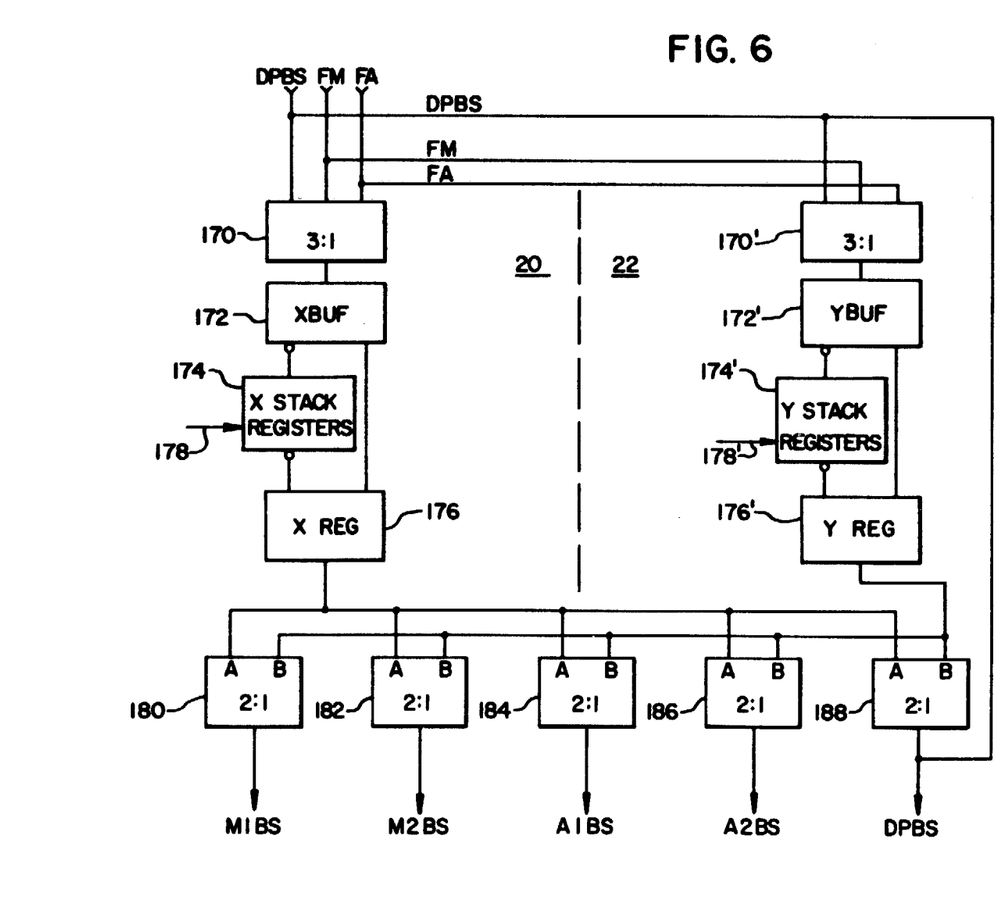
FIG. 6 is a block diagram illustrating data pad circuitry according to the present invention.

FIG. 6 illustrates in greater detail the data pad X, 20, and the data pad Y, 22. Each of the data pads includes a multiplexer 170, 170' for selecting between the buses designated DPBS, FM and FA. The output of the multiplexer is coupled to an input buffer 172, 172' which in turn supplies an output either to stack registers 174, 174' or directly to output register 176, 176'. The stack registers 174, 174', and particularly the registers selected by address, 178, 178' also supply outputs to output register 176, 176'. The contents of registers 176 and 176' are available as selectable inputs to multiplexers 180, 182, 184, 186 and 188 which respectively feed buses M1BS, M2BS, A1BS, A2BS and DPBS.

The data pads, characterized by fast access and retrieval times, are primarily used as accumulators. Each of the data pads behave, as a block of accumulators, wherein each of the blocks 174 and 174' includes a stack of 32 registers. The data pads behave as accumulators in the sense that information loaded on one instruction in one clock cycle can be read out on the next instruction in the next clock cycle. Information can be read into and out of a data pad in one instruction without conflict, it being understood the value read out is the previously stored value available for use on this next instruction. This flexibility enhances the speed of simultaneous computations. The two halves of the data pad, i.e., data pad X and data pad Y, can be used simultaneously and independently.

As can be later seen from the instruction set, a register of the data pad is selected by three bits of address. (See FIG. 10). In addition, a base address, called DPA is employed which is in fact stored in a five bit wide address register 38. (See FIG. 7.) DPA can be incremented or decremented on any instruction, but the three bit address, XR, YR, XW or YW (the X and Y pad read and write indexes) are actually added to the DPA for any instruction. Thus, the DPA selects a series of eight registers in both data pad X and data pad Y. Alternatively, by incrementing and decrementing DPA, each data pad may be treated as a stack.

The timing of write indexes or addresses is skewed with respect to read indexes or addresses. Writing into a data pad actually takes place at the end of an instruction, whereupon the information is loaded into a buffer 172 or 172' comprising a fast latch with a narrow window. The information is not actually written into the specified stack register within block 174 and 174' until the second half of the next instruction, and if the programmer wants the information just written, the input buffer 172 or 172' is directly accessed into register 176 or 176' and directed via the appropriate multiplexer to the desired destination. Reading is accomplished during the first half of an instruction or clock cycle. A portion of the address logic for bringing about this sequence is illustrated in FIG. 7.

Figure 7:
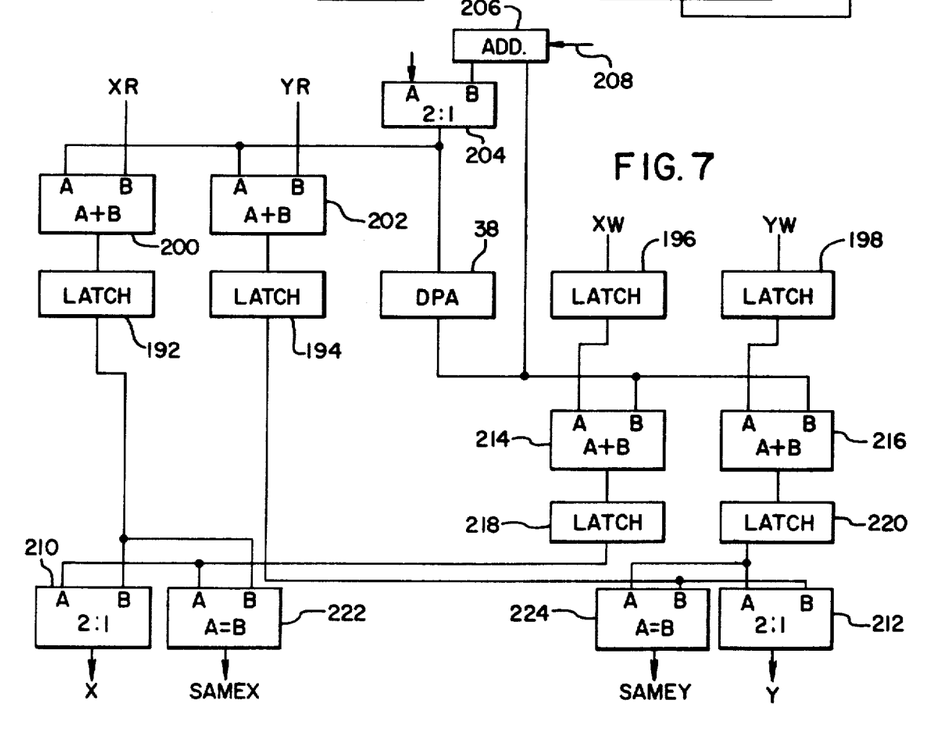
FIG. 7 is a block diagram of address logic for operating the data pad circuitry of FIG. 6.

Referring to FIG. 7, latches 192, 194, 196 and 198 form a portion of the instruction register 16. (See FIGS. 1 and 2.) Latches 196 and 198 receive portions XW and YW of the instruction directly, while latches 192 and 194 receive XR and YR respectively through adders 200 and 202. DPA register 38 is loaded through multiplexer 204 either with an initial address (from S-Pad, FIG. 8), or is reloaded with the previous DPA via the output of adder 206 wherein the previous DPA may be incremented or decremented according to the DPA instruction at 208. The "current" DPA is actually provided at the output of multiplexer 204 to the A input of adders 200 and 202 so that it may be added to XR and YR as hereinbefore indicated. The output of latch 192 is provided directly to an input of multiplexer 210 which supplies the X pad address 178 during the first portion of a clock cycle. Similarly, the output of latch 194 is applied as an input to multiplexer 212 for supplying address 178' to the Y pad. However, the XW and YW write instructions are coupled via latches 196 and 198 to adders 214 and 216 respectively where XW and YW are added to DPA and then the outputs of the adders are supplied to intermediate latches 218 and 220. The interposition of additional latches in the XW and YW paths delays the application of the write addresses, which are then applied the second half of the next clock cycle. Coincidence circuits 222 and 224 each detect the occurrence of a read instruction during the next cycle after the write instruction to the same register. In case of a match, the output of a stack register 174 or 174' is inhibited, and the contents of a buffer 172 are read into output register 176.

Figure 8:
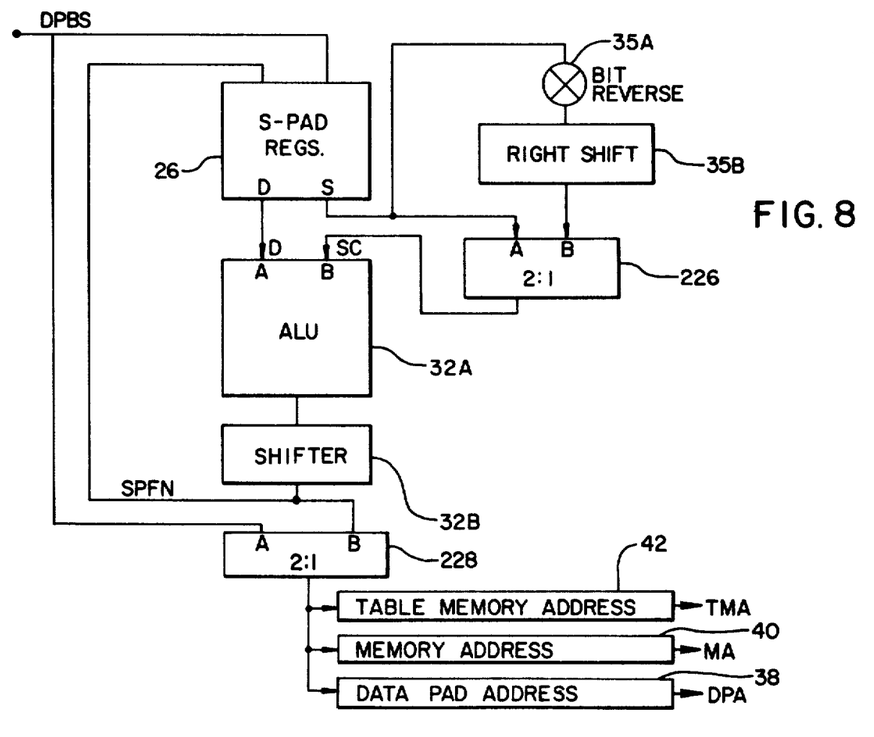
FIG. 8 is a block diagram of an S-Pad or address arithmetic portion of the present processor.

FIG. 8 illustrates in greater detail the address arithmetic or S-Pad included in the present processor. As hereinbefore mentioned, the function of the S-Pad is to provide the address arithmetic in parallel with the main arithmetic of the processor so that control functions, which would ordinarily comprise "overhead" in the conventional computer, can be accomplished concurrently, with a saving of time. The S-Pad circuitry generates addresses which are placed principally in table memory address register 42 or main memory address register 40. Since the output of S-Pad is typically applied to a memory address register, it thereby dictates whatever will be accessed from such memory in the next memory cycle.

The S-Pad may, for example, increment or decrement a selected one of 16 S-Pad registers 26 in one instruction, wherein the S-Pad output D (from a "destination" register) is coupled to ALU 32A for addition of a fixed number thereto or subtraction of a fixed number therefrom. The results are coupled through shifter 32B to the bus labeled SPFN and to a particular "destination" register within S-Pad registers 26.

Alternatively, an arithmetic operation may be performed on the contents of a "source" register within S-Pad registers 26, the output indicated at S being supplied to the A input of multiplexer 226 and from there to the B input of ALU 32A, while a "destination" output of the S-Pad register is provided to ALU 32A via connection D. ALU 32A then brings about some arithmetic combination of integer information from the "source" and "destination" and the result is returned to a destination register via bus SPFN. The registers in S-Pad can be read out, have something added thereto and be read back in the same instruction. It should be understood the operations within S-Pad are integer operations of 16 bits.

The registers within the S-Pad are also frequently employed as counters for keeping track of progress in a particular algorithm, wherein an output may be tested to determine if a particular number of operations or the like has taken place.

The address arithmetic of S-Pad is useful in carrying out procedures such as the Cooley-Tukey fast Fourier transform algorithm. In such case, a base address (indicating the start of data) may be added to a bit reversed count or relative location and the result loaded into a particular memory address, dynamically. Such an operation can be accomplished in one instruction, "on the fly". In one version of a fast Fourier transform algorithm, the address accesses the data, e.g., from main memory, in a bit reversed order, whereby the data remains physically in main memory in original order but is accessed in bit reversed order.

Bit reversal is accomplished in a bit reverse circuit 35A accompanied by a right shift circuit 35B. The bit reverse circuit 35A receives an output, S, from a designated "source" register and reverses it on a bit by bit basis. The circuit comprises crossed connections so that the most significant bit becomes the least significant bit, the least significant bit becomes the most significant bit, etc., to produce a complete reversal in the order of the digits. The output of the bit reverse circuit is then supplied to the right shaft circuit 35B such that the bit reversal can, in effect, be accomplished with respect to a given point. The output of the right shift circuit 35B is then applied to multiplexer 226, as the B input thereof, so that a bit reversed or non bit reversed input can be selected as the B input of ALU 32A. The data then accessed from memory is, in effect, rearranged as dictated by the S-Pad arithmetic.

The output of ALU 32A can also be shifted as desired by shifter 32B and coupled as an input to multiplexer 228 as well as to the SPFN bus hereinbefore mentioned. Multiplexer 228 selects either the S-Pad input as the source of information of memory addresses, or alternatively an input from data pad bus, DPBS. Information may be initially supplied to S-Pad registers 26 through the data pad bus, DPBS.

Figure 9:
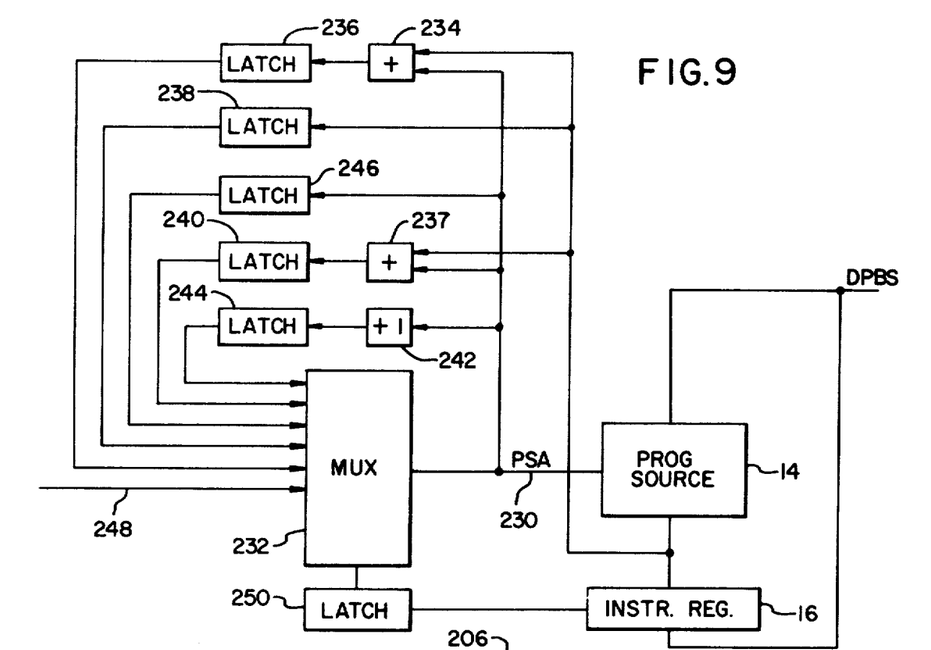
FIG. 9 is a block diagram of program source address logic of the processor.

The program source address logic, illustrated in FIG. 9, enables relative addressing calculations to be expedited by permitting such calculations to be carried on in parallel with branch decode. Referring to FIG. 9, program source memory 14 may be loaded from the data pad bus DPBS, and in turn provides its stored instructions to instruction register 16 which functions as control means for bringing into play various data paths hereinbefore indicated. For instance, the instruction register controls multiplexers at the inputs of the adder, the multiplier, the data memory, and the data pads to provide the data paths selected in accordance with the instruction. Individual leads from the instruction register to the various multiplexers and the like have been omitted from the drawings in the interest of clarity, and the manner of implementation thereof will be understood by those skilled in the art upon consideration of the instruction set as hereinafter described in connection with FIG. 10. The program source memory 14 is addressed by means of a program source address, PSA, applied as indicated at 230 from multiplexer 232. In addition, the output of the multiplexer is coupled through adder 234 to latch 236, through adder 237 to latch 240, and through add-one circuit 242 to latch 244, wherein the outputs of the respective latches are supplied as separate inputs to multiplexer 232. Furthermore, the output of the multiplexer is connected directly to latch 246 which supplies another input to multiplexer 232.

Predetermined portions of the selected address from program source memory 14 and coupled to adders 234 and 237 wherein the values thereof are added to the program source address. A further output of the program source memory is applied directly to latch 238, the output of which supplies an additional input to the multiplexer 232. Another input to multiplexer 232, indicated at 248, is suitably supplied from the interface 10.

During every instruction cycle, the FIG. 9 program source circuit generates all possible next instruction addresses for application to program source memory 14. The normal sequence of events is one of sequencing through the instructions in program source memory 14 and providing the same, one by one, to instruction register 16 whereby such instructions are carried out. For this purpose, the "present" program source address is coupled to add-one circuit 42 and delivered to latch 244. The contents of latch 244 are then routinely selected by multiplexer 232 for application as the next address to the program source memory during the next clock cycle. However, the present circuit allows the execution of conditional branches and jumps without any loss of time, inasmuch as the branch address or the jump address is also generated and latched during an instruction cycle for selection by multiplexer 232 should the same be needed. For example, the branch displacement of the "present" instruction (bits 27–31 in FIG. 10) is added to the "present" address in adder 238 and the result is stored in latch 240 should the branch condition be true. If the branch condition is true, instruction register 16 receives an input (not shown) from the circuit output tested, causing latch 250 to store a code causing multiplexer 232 to select the output of latch 240 as the next address for the program source memory.

The lower 12 bits of the "current" instruction (bits 52–63 in FIG. 10) are provided as the input to latch 238, and as an input to adder 234 in conjunction with the "current" program source address. If the current instruction indicates an absolute jump, instruction register 16 supplies a code to latch 250 which will cause multiplexer 232 to select the output of latch 238 as the next program source address. If a relative jump is indicated by the instruction, instruction register 16 supplies a code to latch 250 which will select the output of latch 236 as the program source address. This program source address will be the sum of previous program source address and the 12 lower order bits of "current" instruction from program source memory 14. Latch 246 receives the "current" program source address and delivers the same for a possible selection by multiplexer 232. The reselection of the same address is employed for diagnostic purposes.

It will be seen ths parallel generation of all possible next addresses enhances the general parallelism and speed of the machine. That is, the parallel operations may continue on a cycle by cycle basis without awaiting a branch decision.

Figure 10:
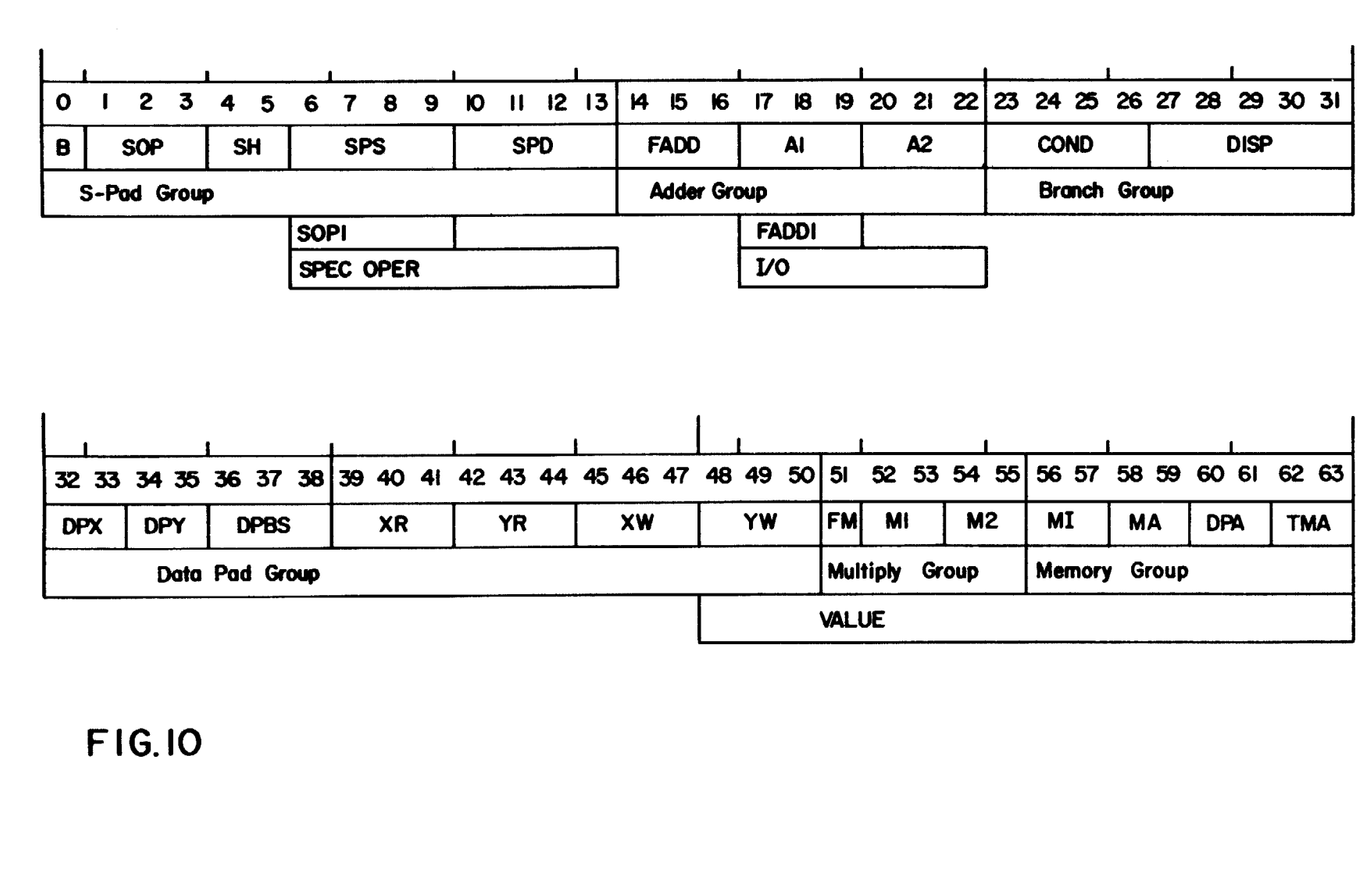
FIG. 10 is a representation of an instruction set configuration for operating the processor according to the present invention.

FIG. 10 illustrates the 64 bit instruction set employed for programming the present processor. This comprehensive instruction set facilitates rapid computation by the implementing of the instructions during each cycle of machine operation. As hereinbefore indicated the adder and multiplier are pipelined, whereby the results of a given multiplication, addition or similar arithmetic operation take more than one clock cycle to complete, but results are available every clock cycle at the end of the pipeline such that efficient calculation can be carried out.

Referring to FIG. 10, the instruction set, suitable for loading into the program source memory, is composed of six groups; the S-Pad group, the adder group, the branch group, the data pad group, the multiply group and the memory group. Starting at the digit designated 0, at the most significant bit in the instruction set, the zero bit is referenced by the letter B and enables the bit reverse circuit 35 in the S-Pad. The designation SOP stands for S-Pad operation and controls the S-Pad for requiring its ALU to perform an arithmetic operation such as add or subtract, or to perform a single operand procedure such as increment or decrement a destination register. SPS normally indicates the address of the source register selected in S-Pad, while SPD normally indicates the destination register selected in S-Pad, but in the event of a single operand instruction the SPS field is utilized to designate the particular operation desired. SH stands for the shift value applicable to shifter 32B.

If SOP is a one, i.e., 001, then the meaning of the SPS and SPD fields are redefined as a special operation (SPEC OPER). Among the special operations is a call for a jump to which the program source address logic in FIG. 9 is responsive, and wherein lower order bits in the instruction set designated "VALUE" will in that event provide the number of places for the absolute or relative jump. SPEC OPER can also call for such operations as loading S-Pad from the specified source or writing information into the program source memory. Clearly, other special operations may also be directed as desired.

The adder group field includes the floating add instruction FADD which may direct a floating addition, substraction, or a floating logical operation such as AND, OR or equivalence. A1 and A2 specify the desired adder inputs from among the choices indicated on the FIG. 1 block diagram.

A particular designator in the FADD field is alternatively employed to specify bits 17 through 22 as an input-output group, indicated as I/O. The input-output group is then employed as a set of input-output instructions and the same group is employed for control purposes, as for example providing a halt instruction.

The branch group includes a branch condition in bits 23 through 26, and a branch displacement in bits 27 through 31. The branch condition can select a value or output for testing, for example, the output of S-Pad or the output of the floating adder, or the value on the data pad bus, or a condition from an I/O device can be tested. For example, a branch can be made contingent on the condition the output of the S-Pad circuit on bus SPFN is zero. Alternatively the displacement may be designated as "unconditional". The displacement, which may comprise a forward displacement up to 15 places or a backward displacement up to 16 places, is provided as an input to adder 237 in FIG. 9.

Referring to the data pad group, DPX and DPY select among the possible inputs to data pad X and data pad Y as indicated in FIG. 1. Similarly, the instruction, DPBS, comprising bits 36 through 38, specifies the input to be provided on the bus DPBS from among the memories and data pads as illustrated in FIG. 2. The data pad group also includes the indices XR, YR, XW and YW for reading and writing the data pads, and specifically entered into the instruction register in the manner illustrated in FIG. 7. The multiply group includes a floating multiply designation, FM, which specifies whether or not a floating multiply operation is to take place, while M1 and M2 select the sources to be coupled respectively to the multiplicand and the multiplier input for multiplier 36 from among those indicated in FIG. 1.

In the memory group, MI designates the input to be supplied to the data memory, i.e., main memory input register MI, from among the possible inputs indicated in FIG. 1, while MA, DPA and TMA respectively indicate the source for an address for memory address register 40, data pad address register 38, and table memory address register 42. MA, DPA and TMA in the instruction set may further specify whether the address registers referenced are to be incremented or decremented.

The comprehensiveness of the instruction set including basically independent fields points up the number of substantially independent operations which may be carried on simultaneously without interference, whereby intermediate results are made available for immediate processing in the next instruction cycle following. Any of the parallel paths indicated in FIGS. 1 and 2 may be employed independently without conflict in carrying out floating point arithmetic operations. The intercoupling between the basic elements of the processor can be changed dynamically, on the fly, without requiring "overhead" time for bringing about a changed configuration.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A data processor including arithmetic means and memory register means comprising a data pad, said data pad comprising:

an input register,
an output register,
a plurality of stack registers, means for individually addressing said stack registers for writing in and reading out information, wherein said means for addressing includes a first address register for storing a data pad base address and means for adding that base address to an index or relative address for selecting among a group of stack registers designated by said data pad address, and further including means for changing said data pad address in said first address register, means for coupling said input register to an addressed stack register for writing in information, means for normally coupling said output register to an addressed stack register for reading out information, and means for selectively coupling said output register to read out information from said input register when information is addressed for read out next after writing in of the same information.

2. The processor according to claim 1 further including means for detecting when a stack register is addressed for read out next after the same stack register is addressed for writing in information, said means for selectively coupling said output register being responsive to said detection to read out information from said input register.

3. The processor according to claim 1 wherein said means for selectively coupling said output register is responsive to addressing information for read out on the next clock cycle after writing the same information for thereupon coupling said output register to the input register.

4. The processor according to claim 1 wherein said means for normally coupling said output register for reading out information is timed for operation during a first portion of a clock cycle, and said means for coupling said input register for writing in information is timed for operation during a second portion of the same clock cycle.

5. The processor according to claim 1 wherein said means for changing said data pad address in said first address register comprises means for alternatively incrementing or decrementing said data pad address.

6. The data processor according to claim 1 wherein said means for adding the base address to an index includes first means for adding the base address to a write index employed for selecting a register into which information is to be written and second means for adding the base address to a read index for selecting a register from which information is to be read.

7. The processor according to claim 6 including means for delaying the addition output of said first means until the next clock cycle for addressing a stack register.

8. The data processor according to claim 1 further including a second plurality of stack registers and means for individually addressing said stack registers of said second plurality, said last mentioned means including means for adding said base address from said first address register to an index or relative address for selecting among a group of said second plurality of stack registers designated by the same data pad address.

9. The processor according to claim 1 including multiplexer means for coupling an input to said input register and further multiplexer means for receiving an output from said output register.

* * * * *

UNITED STATES PATENT AND TRADEMARK OFFICE
CERTIFICATE OF CORRECTION

PATENT NO. : 4,179,734

DATED : December 18, 1979

INVENTOR(S) : GEORGE P. O'LEARY

It is certified that error appears in the above—identified patent and that said Letters Patent is hereby corrected as shown below:

Column 1, lines 25 through 28, the sentence beginning with "Moreover" and ending with "simultaneously" should have been deleted.

Column 1, lines 51 through 56, the paragraph beginning with "It is another" and ending with "memory" should have been deleted.

Column 3, line 15, "34" should have been --35--.

Column 5, line 32, "FAS0" should have been --FAS∅--.

Column 5, line 67, "shift 90" should have been --shifter 90--.

Column 6, line 13, "Q" should have been --$\bar{Q}$--.

Column 8, line 36, "114" should have been --144--.

Column 9, line 52, "behave," should have been --behaves--.

Column 10, line 15, "174 and 174'" should have been --174 or 174'--.

Column 11, line 51, "shaft circuit 35B" should have been --shift circuit 35B--.

UNITED STATES PATENT AND TRADEMARK OFFICE
CERTIFICATE OF CORRECTION

PATENT NO. : 4,179,734

DATED : December 18, 1979

INVENTOR(S) : GEORGE P. O'LEARY

It is certified that error appears in the above—identified patent and that said Letters Patent is hereby corrected as shown below:

Column 12, line 29, "14 and" should have been --14 are--.

Column 13, line 12, "ths" should be --the--.

Signed and Sealed this

Third Day of January 1984

[SEAL]

Attest:

GERALD J. MOSSINGHOFF

Attesting Officer     Commissioner of Patents and Trademarks